United States Patent Office 3,203,861
Patented Aug. 31, 1965

3,203,861
COMPOSITIONS HAVING HIGH DIURETIC ACTION AND A HIGH RATIO OF ELIMINATION OF SODIUM WITH RESPECT TO POTASSIUM
Charles Riviere, Neuilly-sur-Seine, France, assignor to Le Progress Scientifique, Paris, France, a French society
No Drawing. Filed Mar. 10, 1961, Ser. No. 94,939
2 Claims. (Cl. 167—65)

The present invention relates to a new chemical compound of the chlorothiadiazide series having, in relation to the other members of the series, remarkable properties which render it particularly valuable. This new compound is the potassium salt of 3-trichloromethyl-6-chloro-7-sulphonamido-3,4-dihydro-benzo-1,2,4-thiadiazine-1,1-dioxide, of the formula

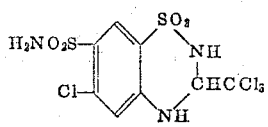

The advantages of certain diuretic sulphonamides, more particularly the compound hydrochlorothiazide, which is 6-chloro-7-sulphonamido-3,4-dihydro-benzo-1,2,4-thiadiazine-1,1-dioxide are already known.

The compound according to the invention differs advantageously from hydrochlorothiazide and its derivatives which are mono- and di-chloromethylated in the 3-position firstly in the degree of its diuretic action, secondly in the sodium/potassium elimination ratio which can be obtained by its use and, thirdly, in its field of activity which is distinctly different from that of hydrochlorothiazide and its aforesaid derivatives.

The free acid form of the compound according to the invention may be prepared by condensing with cyclization the appropriate aromatic ortho-aminosulphonamide with the appropriate aldehyde according to the following reaction:

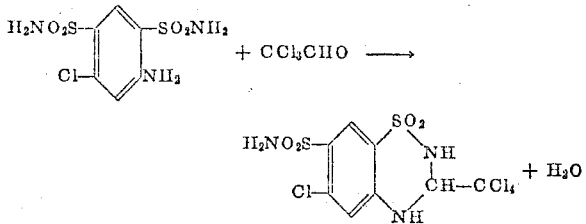

An example of this method of preparation is given hereunder.

EXAMPLE 10 grams (0.035 mol.) of 4-amino-6-chloro-benzene-1,3-disulphonamide were heated in a closed vessel at 100° C. for 20 hours with 7.5 grams (0.045 mol.) of chloral hydrate in the presence of 1.5 cc. of catalysing ammonia (solution having a density 0.925) and 40 cc. of water.

After cooling and filtration, the reaction mixture was dissolved in boiling 5% aqueous soda solution to form the mono-sodium salt of the desired compound and the solution was cooled and filtered to separate the unreacted reagents. The filtrate was acidified and the trichloromethyl hydrochlorothiazide compound crystallised. The product was drained, washed with water and dried, the yield obtained being 80%.

An example of a suitable method of forming the potassium salt is given below:

POTASSIUM 3 - TRICHLOROMETHYL - 6 - CHLORO - 7 - SULPHONAMIDO - 3,4 - DIHYDRO - BENZO - 1,2,4 - THIADIAZINE - 1,1 - DIOXIDE (PS 207)

3 - trichloromethyl - 6 - chloro - 7 - sulphonamido-3,4 - dihydro - benzo - 1,2,4 - thiadiazine - 1,1-dioxide _____grams__ 115
Potassium in pellet form _____do____ 20
Denatured absolute alcohol _____ml__ 300

The potassium was dissolved in the hot alcohol to give a yellow solution and the sulphonamide was added thereto after cooling: The mixture coagulated and the temperature increased to 30° C.; the paste then became fluid and the salt formed became alkaline. The mixture was agitated and filtered after one hour. The product obtained was washed with 50 cc. of absolute alcohol and dried at 35° C. until the weight was constant.

Obtained: 116 grams, that is a yield of 92.5 percent.
The product is completely soluble in water.
The characteristics of this potassium salt constituting the compound according to the invention are as follows:

It has a very small solubility in the aqueous acid solutions and is practically insoluble in the organic solvents.

The characteristics of the potassium salt which constitute the compound according to the invention are the following.

White crystalline powder, inodorous, slightly bitter to the taste
Molecular weight: 453.17
Content in potassium: 8.6%
Content in labile chlorine: 23%
Content in nitrogen: 9.27%
Melting point: the salt of potassium compound does not melt (contrary to the acid form, which melts at 285° C.)
Ultra-violet spectrum: Maximum at 225 mµ with an optic density not below 0.900 (theory 0.945)
Minimum at 241 mµ with an optic density near 0.080
Maximum at 267 mµ with an optic density not lower than 0.400 (theory 0.430 with a slit width between 0.30 and 0.35 mm.)
Minimum not very clear near 250–295 mµ with an optic density next to 0.060
Maximum not very clear near 305–310 mµ with an optic density next to 0.070
A null absorption above 350 mµ

This potassium salt, contrary to the free acid form, is soluble in water and may be administered either in the form of tablets, or in the form of a solution which can be injected in doses containing from 25 to 200 mg. of active principle.

In comparison with other known diuretic agents, the product according to the present invention is distinguished by a whole series of advantages, some of which are entirely unexpected.

More particularly, active doses of the product according to the invention are lower than the average doses of those diuretic sulphonamides which are closest in their structure, while attaining a maximum level of action which is higher for this smaller dose and while preserving its effectiveness for greater length of time. One of the most important properties of the product according to the invention in relation to those products which are closest in their structure, and more particularly in relation to hydrochlorothiazide and mono or dichloromethyl hydrochlorothiazide, is the fact that the product according to the invention has a ratio of elimination of sodium in proportion to potassium which is substantially more favourable without any symptom of either acute or chronic toxicity.

Given hereunder by way of illustration of the general pharmacological properties are comparative measurements of diuretic activity, in the first place between the product according to the invention and hydrochlorothiazide, in the second place between the product according to the invention, that is to say the potassium salt of trichloromethyl hydrochlorothiazide and the same compound but in the unsalified acid form, that is to say trichloromethyl hydrochlorothiazide itself, and in the third place between the product according to the invention and dichloromethyl hydrochlorothiazide.

*(1) Comparative study between hydrochlorothiazide and the product according to the invention*

The tests, which were applied to a total of more than 2,000 animals, were carried out on groups of 100 rats, in the first place with increasing doses of hydrochlorothiazide and then with the same doses of hydrochlorothiazide associated with constant doses of the product according to the invention.

The results have been expressed in percentage of diuresis and of elimination of sodium and potassium respective in relation to the weight of the animal in kilograms. The first part of these results establishes that the maximum diuresis obtainable with hydrochlorothiazide alone does not exceed about 75%, even by doubling the dose beyond 5 mg./kg., whereas in the same animals the addition of a small quantity of the product according to the invention, designated by the code PS 207, which quantity does not itself enable a diuresis greater than 50–60% to be obtained in control animals, results in a considerable increase in the diuresis of the animals. It will be noted that this increase is found in the diureses of water and sodium, whereas the potassium diuresis is practically speaking not increased. These results constitute proof that the ways in which the two types of sulphonamides act are different and that the addition of the product according to the invention to a treatment with hydrochlorothiazide enables the ceiling which limited the action of hydrochlorothiazide to be raised very substantially.

| Mg./kg. | | Diuresis (percent) | Elimination of sodium mg/kg of body weight | Elimination of potassium mg/kg of body weight |
|---|---|---|---|---|
| Hydrochlorothiazide | PS 207 | | | |
| 2.5 | 0 | 60.7 | 3.34 | 1.01 |
| 5 | 0 | 78.1 | 3.9 | 1.50 |
| 10 | 0 | 77.1 | 4.1 | 1.40 |
| 2.5 | 1.25 | 79.3 | 4.2 | 1.30 |
| 5 | 1.25 | 91.2 | 4.7 | 1.30 |
| 10 | 1.25 | 84.6 | 4.3 | 1.40 |
| Control 0 | 1.25 | 67.0 | 3.1 | 1.00 |

*(2) Comparative action of the product according to the invention (potassium salt) and the unsalified product (referred to as base sulphonamide)*

The measurements tabulated hereunder were made after administration to rats by the oral method (Burn's method as modified by W. L. Lipschitz, J. Pharm. Exp. Ther. 1953–73).

The measurements were carried out on groups of 40 animals.

The calculations were made using the elimination of sodium or potassium per kilogram of body weight of the animal, the values being expressed in milligrams and in millimoles of Na and K per kilogram of bodyweight of the animal.

TABLE 1.—UNSALIFIED SULPHONAMIDE ADMINISTERED IN SUSPENSION

| Base sulphonamide, dose mg./kg. | Diuresis percent | Elimination | | Na/K |
|---|---|---|---|---|
| | | Na mg./kg. of body weight | K mg./kg. of body weight | |
| 0 | 26.9 | 0.97 | 0.80 | 1.2 |
| 0.625 | 44.9 | 4.7 | 1.84 | 2.5 |
| 1.25 | 49.3 | 4.4 | 1.75 | 2.5 |
| 2.5 | 53.1 | 4.35 | 1.6 | 2.7 |
| 5. | 76 | 5.2 | 1.9 | 2.7 |
| 10 | 78.1 | 5.6 | 2.35 | 2.4 |

Contrary to the unsalified sulphonamide, the potassium salt enables a clear solution to be obtained which has a slightly alkaline pH.

This solution administered by the buccal method to the test rat (same technique as before) enables a diuresis of water of 67% of the starting overload with 5 mg./kg. of active substance, 75% with 10 mg. and 101% for a dose of 20 mg. to be obtained.

TABLE 2.—SALIFIED SULPHONAMIDE ACCORDING TO THE INVENTION

| Dose mg./kg. K salt (PS 207) | Diuresis percent | Elimination | | Na/K |
|---|---|---|---|---|
| | | Na mg./kg. of body weight | K mg./kg. of body weight | |
| 0 | 26.9 | 0.97 | 0.80 | 1.2 |
| 0.625 | 33 | 3.74 | 1.25 | 3 |
| 1.25 | 64.3 | 3.72 | 1.5 | 2.5 |
| 2.5 | 78.2 | 4.5 | 1.44 | 3.1 |
| 5. | 95 | 4.97 | 1.80 | 2.8 |
| 10 | 112.5 | 6.90 | 1.85 | 3.7 |

The threshold dose of activity may be fixed at around 0.5 mg./kg. with the technique employed, the threshold dose of hydrochlorothiazide, under the same conditions, being greater than 5 mg./kg. It is to be observed that the threshold of activity of sodium diuresis is much lower since, in anaesthetised dogs, a saline diuresis is obtained for a threshold dose of 0.1 mg./kg. of product, while a water diuresis threshold dose of the order of 5 mg./kg. is obtained.

The difference between the action of the potassium salt and of the base sulphonamide is particularly clear from the evolution of the sodium/potassium elimination ratio.

TABLE 3.—RATIO OF ELIMINATION OF SODIUM TO POTASSIUM OBTAINED IN RATS WITH THE UNSALIFIED BASE SULPHONAMIDE IN AQUEOUS SUSPENSION (TESTS CARRIED OUT ON 80 ANIMALS)

| Dose of unsalified base sulphonamide, mg./kg. | Na/K, in millimoles |
|---|---|
| 0 | 1.5 |
| 1.25 | 2.6 |
| 2.5 | 2.2 |
| 5 | 1.8 |
| 10 | 2.2 |
| 20 | 2.6 |
| 40 | 3 |
| 80 | 2.6 |

With the strong doses, a slight increase in the ratio may be noted; this confirms the low diuretic activity found according to the volume of urine and the elimination of salts.

Whereas the most favourable ratio (increase in sodium for a slight increase in potassium) found with the base sulphonamide is less than 2 for a dose of 40 mg./kg. of product, the potassium salt according to the invention enables ratios as high as 5 to be obtained for a dose of 2.5 mg./kg.

TABLE 4.—Na/K ELIMINATION RATIO OBTAINED WITH THE PRODUCT ACCORDING TO THE INVENTION IN RATS (TESTS CARRIED OUT ON 264 ANIMALS)

| Doses of potassium salt, mg./kg. | Tests | | | | | | | |
|---|---|---|---|---|---|---|---|---|
| | 1 | 2 | 3 | 4 | 5 | 6 | 7 | 8 |
| 0 | 1.1 | 1.6 | 0.8 | 0.9 | | 1.1 | 0.7 | 1.6 |
| 0.625 | | | 2.1 | | | | | |
| 1.25 | | | | | | | 2.1 | 2.9 |
| 2.5 | | | 3 | 5 | 4 | 3.6 | | |
| 5 | | 4.8 | | 3.6 | 3.9 | 2.3 | 2.8 | 5.3 |
| 10 | 2.2 | 4.5 | | 2.4 | 4.2 | | 3.8 | 4.6 |
| 20 | 2.6 | 3.7 | | 3.1 | 4.7 | | | 2 |
| 40 | 3.4 | | | | | | | |
| 80 | | 4.5 | | | | | | |

It is to be noted that this ratio is more favourable than those obtained, whatever the dose of substance, both with acetazolamide and with chlorothiazide or hydrochlorothiazide, which are relatively closely related products and the activities and properties of which may be taken as terms of comparison as regards the product according to the invention.

TABLE 5.—Na/K RATIO OBTAINED WITH VARIOUS DIURETIC SULPHONAMIDES (TESTS CARRIED OUT ON 272 ANIMALS)

| Dose of diuretic, mg./kg. | Tests | | | |
|---|---|---|---|---|
| | 1 | 2 | 3 | 4 |
| Acetazolamide: | | | | |
| 0 | 1.6 | 1 | 0.9 | 1 |
| 0.625 | | | | 2 |
| 1.5 | | | | 2.1 |
| 2.5 | | 1.8 | 1.8 | |
| 5 | | 1.8 | | |
| 10 | 5.6 | 1.7 | 2.3 | |
| 20 | 3 | 1.6 | | |
| 40 | 2.3 | 1.5 | | |
| Chlorothiazide: | | | | |
| 0 | 0.9 | 1.1 | | |
| 5 | 1.6 | | | |
| 10 | | 2.2 | | |
| 40 | 2.8 | 2 | | |
| Hydrochlorothiazide: | | | | |
| 0 | 1 | 0.9 | | |
| 0.625 | | 2.5 | | |
| 2.5 | | 2.4 | | |
| 5 | 2.8 | | | |
| 10 | 3.1 | | | |

TABLE 6.—Na/K RATIO OBTAINED WITH ANAESTHETISED DOGS KEPT UNDER HYDROSALINE OVERLOAD AND RECEIVING THE DIURETIC INTRAVENOUSLY

[Product according to the invention: K salt (PS 207)—Control values: 5.5–4.2–5.5–6.5]

Doses mg./kg.: Values obtained
0.1 ------------------------------------ 6.4
1 -------------------------------------- 7.4
10 ------------------------------------- 8.4
50 ------------------------------------- 11.4

[Hydrochlorothiazide—Control values: 3–4.7]

Average of 8 experiments with 15 mg./kg. hydrochlorothiazine ------------------------------- 4.5

It is found in anaesthetised dogs under hydrosaline overload that the Na/K ratio may attain values higher than 10, after administration of the product according to the invention, whereas under the same conditions it is not possible to obtain ratios higher than 6 with hydrochlorothiazide.

(3) *Comparative action of the product according to the invention ("PS 207") and of dichloromethyl hydrochlorothiazide*

The respective activities of the dichloromethylated derivative and the trichloromethylated derivative (unsalified base sulphonamide), compared with that of hydrochlorothiazide, have been found to be of the order of 15 times and 0.5 time that of the reference product (hydrochlorothiazide).

It is thus entirely surprising to find that, on the other hand, the potassium salt of the trichloromethylated derivative ("PS 207") has an activity slightly greater than that of the dichloromethylated derivative and of the order of 20 times that of hydrochlorothiazide. These results were obtained with dogs and rats under experimental conditions similar to those described above. Moreover, another distinct and surprising advantage of "PS 207" with respect to the dichloromethylated derivative has been found, namely that the potassium diuresis of the dichloromethylated derivative is greater than that of hydrochlorothiazide (of the order of 4 times) and a result at least of the same order would have been expected with the trichloromethylated derivative. On the contrary, however, the potassium salt of the latter (PS 207) has practically no influence on the potassium diuresis.

This combination of advantages is found again in the results of the clinical tests, which demonstrate indisputably that the product according to the invention, that is to say the potassium salt of 3-trichloromethyl-6-chloro-7-sulphonamido - 3,4 - dihydro-benzo-1,2,4-thiadiazine-1,1-dioxide, behaves as a powerful diuretic producing only a negligible elimination of potassium, whereas the unsalified base sulphonamide is only slightly diuretic, to the extent of about half as much as hydrochlorothiazide itself.

In forty cases involving congestive cardiac insufficiency with peripheral edema, twenty-three patients had arterial cardiopathy with predominating insufficiency of the left ventricle and a senile heart, other patients had an insufficiency of the right ventricle resulting from a "chronic pulmonary heart," whilst some others had decompensated valvular cardiopathy. The doses used were very small, of the order of 0.10 gram per day, and were administered in two portions. It will be noted that 0.055 gram of potassium salt is equivalent to 0.050 gram of the base sulphonamide.

In all the cases observed, no case of digestive intolerance were found due to direct action of the product, nor any clinical hypochloremia, hyponatremia or hypokalemia disorders. In addition, no notable statistical difference was observed in the pH value of the blood.

I claim:
1. A pharmaceutical composition for the treatment of edematous conditions and for enhancing the rate of excretion of sodium ions while maintaining the rate of excretion of potassium ions, said composition comprising 0.025 to 0.200 gram of the potassium salt of 3-trichloromethyl-6-chloro - 7 - sulphonamido - 3,4 - dihydrobenzo-1,2,4-thiadiazine-1,1-dioxide of the formula

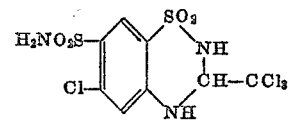

in admixture with a pharmaceutical carrier.

2. A process for enhancing the excretion of sodium ions and maintaining the rate of excretion of potassium ions in a patient suffering from edema, said process comprising administering to the patient a pharmaceutical composition comprising 0.025 to 0.200 gram of the potassium salt of 3-trichloromethyl-6-chloro-7-sulphonamido-3,4-dihydrobenzo-1,2,4-thiadiazine-1,1-dioxide and a pharmaceutical carrier.

References Cited by the Examiner

UNITED STATES PATENTS

| | | | |
|---|---|---|---|
| 3,040,042 | 6/62 | Yale et al. | 260—243 |
| 3,081,301 | 3/63 | De Stevens et al. | 167—650 |

OTHER REFERENCES

Close: Jour. American Chem. Soc., volume 82, pages 1132–1138 (March 5, 1960).

Experientia, volume 16, No. 3, 1960, page 113.

Federation Proceedings, vol. 18, No. 1, part 1, abstract No. 1563, page 396 (March 1956).

FRANK CACCIAPAGLIA, JR., *Primary Examiner.*

IRVING MARCUS, NICHOLAS S. RIZZO, *Examiners.*